United States Patent
Kesselmayer

(10) Patent No.: US 7,025,853 B2
(45) Date of Patent: Apr. 11, 2006

(54) REACTIVE HOT-MELT ADHESIVE COMPOSITIONS WITH IMPROVED GREEN STRENGTH

(75) Inventor: Mark Alan Kesselmayer, Harleysville, PA (US)

(73) Assignee: Rohm and Haas Company, Philadelphia, PA (US)

(*) Notice: Subject to any disclaimer, the term of this patent is extended or adjusted under 35 U.S.C. 154(b) by 53 days.

(21) Appl. No.: 10/460,464

(22) Filed: Jun. 12, 2003

(65) Prior Publication Data

US 2004/0010095 A1 Jan. 15, 2004

Related U.S. Application Data

(60) Provisional application No. 60/393,602, filed on Jul. 3, 2002.

(51) Int. Cl.
*C09J 101/00* (2006.01)
(52) U.S. Cl. .................. 156/331.1; 156/331.2; 156/331.4; 156/331.7; 525/123; 525/131
(58) Field of Classification Search ............ 525/123, 525/131; 156/331.1, 331.2, 331.4, 331.7
See application file for complete search history.

(56) References Cited

U.S. PATENT DOCUMENTS

| 5,021,507 | A | | 6/1991 | Stanley et al. |
| 5,827,926 | A | | 10/1998 | Shimizu |
| 5,866,656 | A | | 2/1999 | Hung et al. |
| 5,877,261 | A | * | 3/1999 | Harder et al. ......... 428/355 AC |
| 5,908,700 | A | | 6/1999 | Shimizu et al. |
| 6,265,700 | B1 | | 7/2001 | Miyata |

FOREIGN PATENT DOCUMENTS

| JP | 05-017736 | 1/1993 |
| JP | 017736/93 | 1/1993 |
| WO | WO 01/81495 | 11/2001 |

OTHER PUBLICATIONS

Derwent Abstract of J02308883.
Chemical Abstract of J02308883.

* cited by examiner

*Primary Examiner*—David J. Buttner
(74) *Attorney, Agent, or Firm*—Carl P. Hemenway

(57) ABSTRACT

A moisture-reactive hot-melt composition, useful as an adhesive, is provided that has improved balance of open time and green strength. In particular, the composition is made from a polyol, a polyisocyante, and an acrylic polymer. Also provided are a method for making such compositions and a method for using such compositions for bonding substrates.

11 Claims, No Drawings

REACTIVE HOT-MELT ADHESIVE COMPOSITIONS WITH IMPROVED GREEN STRENGTH

This application claims the benefit of U.S. Provisional Application No. 60/393,602, filed Jul. 3, 2002.

BACKGROUND

This invention relates to urethane polymer compositions, particularly moisture-reactive hot-melt urethane polymer compositions useful as adhesives, to a method for making such compositions, and to a method for bonding substrates with such compositions.

Some moisture-reactive hot-melt polymer compositions are useful as reactive hot-melt adhesives. Some desirable properties of such adhesives are high green strength, high ultimate strength, and long open time. Green strength is the bond strength prior to completion of the reaction with moisture; ultimate strength is the adhesive strength after the reaction with moisture is essentially complete; and open time is the period of time after the hot-melt adhesive is applied to one or more substrates, during which subsequent substrates may be contacted with the adhesive, without loss of ultimate strength.

U.S. Pat. No. 5,021,507 discloses the modification of polyurethane reactive hot melts with acrylic copolymers of specific molecular weight, in which the polymer contains no monomer with active hydrogen. U.S. Pat. No. 5,827,926 discloses the use of crystalline acrylic polymers containing no active hydrogens.

The approaches taken in the past that have achieved good green strength have also had undesirably short open times. The problem faced by the inventor is the provision of a moisture-reactive hot-melt adhesive composition that achieves a desirably long open time while maintaining usefully high green strength. Surprisingly, the inventor found that incorporation of certain acrylic polymers having tertiary-alkyl amide functionality provided the desired balance of properties.

STATEMENT OF THE INVENTION

In a first aspect of the present invention, there is provided a moisture-reactive hot-melt polymer composition formed by admixing components comprising at least one polyol, at least one polyisocyanate, and at least one acrylic polymer having tertiary-alkyl amide functionality.

In a second aspect of the present invention, there is provided a method of making a moisture-reactive hot-melt composition comprising admixing components comprising at least one polyol, at least one polyisocyanate, and at least one acrylic polymer having tertiary-amide functionality.

In a third aspect of the present invention, there is provided a method for bonding substrates comprising (a) making a moisture-reactive hot-melt composition comprising admixing components comprising at least one polyol, at least one polyisocyanate, and at least one acrylic polymer having tertiary-alkyl amide functionality;

(b) heating said hot-melt composition;

(c) applying said heated hot-melt composition to a first substrate;

(d) contacting said applied heated hot-melt composition with a second substrate; and (e) cooling, or allowing to cool, said hot-melt composition.

DETAILED DESCRIPTION

The composition of this invention is a moisture-reactive hot-melt composition useful as an adhesive. By "moisture-reactive" is meant herein that the composition contains isocyanate groups which are capable of reacting with water desirably to effect an increase in the molecular weight of the composition and/or effect crosslinking of the composition so as to increase the strength properties of the composition subsequent to being contacted with water. By "hot-melt" is meant herein that the composition which may be a solid, semi-solid, or viscous mass can be advantageously heated to provide a fluid adhesive of a viscosity suitable for application to and adhesion to substrates.

The moisture-reactive hot-melt composition of the present invention is formed by admixing components which include at least one polyisocyanate, i.e., an isocyanate bearing at least two isocyanate groups. Polyisocyanates which may be used include for example aromatic polyisocyanates, aliphatic polyisocyanates, cycloaliphatic polyisocyanates, and combinations thereof. Suitable polyisocyanates include, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4"-triphenylmethane triisocyanate, polymethylene polyphenylene polyisocyanate, 2,4,6-toluene triisocyanate, 4,4'-dimethyl-diphenylmethane tetraisocyanate, prepolymers having a Mn less than 2000 and bearing at least two isocyanate groups, and mixtures thereof. Preferred are 4,4'-diphenylmethane diisocyanate (also called 4,4'-MDI), 2,4'-diphenylmethane diisocyanate (also called 2,4'-MDI), and mixtures thereof; more preferred is 4,4'-MDI.

The moisture-reactive hot-melt composition of the present invention is formed by admixing components which include at least one polyol. A polyol is a compound with two or more hydroxyl functional groups. Suitable polyols include a wide variety of compounds, some of which are described in *Polyurethane Handbook*, 2nd edition, edited by G. Oertel, Hanser Publishers, 1994. In addition to the hydroxyl functions, suitable polyols may contain other functionality, such as for example carbonyl, carboxyl, anhydride, unsaturation, or other functional groups. Suitable polyols include, for example, polyether polyols, polyester polyols, polyetherester polyols (sometimes called polyether ester polyols and/or polyester ether polyols), fatty polyols, and mixtures thereof. Suitable polyol(s) may be independently selected from crystalline, semi-crystalline, or amorphous polyols.

Polyester polyols suitable for use in the present invention include those formed from diacids, or their monoester, diester, or anhydride counterparts, and diols. The diacids may be saturated $C_4$–$C_{12}$ aliphaticg acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, 4,4'-diphenylamide dicarboxylic acids, and mixtures thereof.

The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butandediol, neopentyl glycol, 1,3-butandediol, hexanediols, 2-methyl-2,4-pentanediol, cyclohexane-1,4-dimethanol, 1,12-dodecanediol, diethylene glycol, and mixtures thereof. Mixtures of the various suitable polyester polyols are also suitable for use in the present invention. The preferred polyester polyols are 1,6 hexanediol adipate; 1,6 hexanediol neopentyl glycol adipate; neopentyl glycol adipate and mixtures thereof. The polyester polyol(s) preferably has a weight-average molecular weight ("Mw" as measured by gel permeation chromatography) from 250 to 8,000, more preferably 300 to 6,000, even more preferably 400 to 5,000, and most preferably 500 to 4,000.

Polyether polyols suitable for use in the present invention include polyoxy-$C_2$–$C_6$-alkylene polyols, including branched and unbranched alkylene groups. Examples of suitable polyether polyols include, for example, polyethylene glycol, polypropylene glycol, polytetramethylene glycol or random or block copolymers of these polyethers, and mixtures thereof Mixtures of the various suitable polyether polyols are also suitable for use in the present invention. The preferred polyether polyols are polypropylene glycols, also known as polypropyleneoxides. The polyether polyol preferably has a weight average molecular weight ("Mw" as measured by gel permeation chromatography), from 800 to 8,000, more preferably from 900 to 4,000.

In some embodiments of the present invention, the components include at least one fatty polyol. "Fatty" means herein any compound that contains one or more residues of fatty acids. Fatty acids are well known in the art. They are described, for example, by R. A. Burns in *Fundamentals of Chemistry*. Third Edition (Prentice Hall, 1999). Fatty acids are long chain carboxylic acids, with chain length of at least 4 carbon atoms. Typical fatty acids have chain length of 4 to 18 carbon atoms, though some have longer chains. Linear, branched, or cyclic aliphatic groups may be attached to the long chain. Fatty acid residues may be saturated or unsaturated, and they may contain functional groups, including for example alkyl groups, epoxide groups, halogens, sulfonate groups, or hydroxyl groups, that are either naturally occurring or that have been added. Suitable fatty polyols include, for example, fatty acids, esters of fatty acids, amides of fatty acids, and mixtures thereof as long as the compound is a polyol. Further examples of suitable fatty polyols include, for example, dimers, trimers, oligomers, or polymers of fatty acids; dimers, trimers, oligomers, or polymers of esters of fatty acids; dimers, trimers, oligomers, or polymers of amides of fatty acids; dimers, trimers, oligomers, or polymers of mixtures of fatty acids, esters of fatty acids, and amides of fatty acids; or mixtures of such dimers, trimers, oligomers, or polymers, as long as the fatty compound is a polyol. The hydroxyl functions of a suitable fatty polyol may reside on the fatty add residue, on other parts of the molecule, or on both.

In embodiments of the present invention in which fatty polyols are used, some preferred fatty polyols are castor oil, the products of hydroxylation of unsaturated or polyunsaturated natural oils, the products of hydrogenations of unsaturated or polyunsaturated polyhydroxyl natural oils, polyhydroxyl esters of alkyl hydroxy fatty acids, polymerized natural oils, and alkylhydroxylated amides of fatty acids. More preferred are castor oil, hydroxylated soybean oil, hydrogenated castor oil, polymerized castor oil, hydroxy ethyl ricinoleate, and hydroxy ethyl ricinoleamide. Most preferred is castor oil.

In the practice of the present invention, the preferred polyols are polyether polyols, polyester polyols, fatty polyols, and mixtures thereof. More preferred is a mixture that contains at least one polyether polyol and at least one polyester polyol. Even more preferred is a mixture that contains at least one polyether polyol, at least one polyester polyol, and at least one fatty polyol. When polyether polyol(s) and polyester polyol(s) are both used, the preferred weight ratio of polyether polyols to polyester polyols is from 0.5:1 to 12:1; more preferred is 0.6:1 to 10:1; even more preferred is 0.7:1 to 8:1; most preferred is 0.8:1 to 5:1. When fatty polyol(s) are used in addition to other polyols, the preferred weight ratio of fatty polyols to all other polyols is 0.005:1 to 5:1; more preferred is 0.008:1 to 1:1; even more preferred is 0.01:1 to 0.5:1, and most preferred is 0.02:1 to 0.1:1.

The moisture-reactive hot-melt composition of the present invention is formed by admixing components which include at least one acrylic polymer containing tertiary-alkyl amide functionality. Acrylic polymers are polymers formed by the polymerization of one or more (meth)acrylic monomers. These monomers include acrylic acid, methacrylic acid, their esters, amides, and derivatives thereof. A polymer made by polymerization of a mixture of monomers is said to "include" of each of those monomers. Herein, "(meth) acrylic" will mean "acrylic or methacrylic"; and "(meth) acrylate" will mean "acrylate or methacrylate." Some acrylic monomers suitable for inclusion in the acrylic polymer of the present invention are, for example, (meth)acrylic acid, alkyl (meth)acrylate esters wherein the ester group consists of a linear, branched or cyclic alkyl group with 1 to 70 carbon atoms. Also suitable are aryl (meth)acrylate esters, halogenated alkyl or aryl (meth)acrylate esters, other (meth)acrylate esters, N-substituted (meth)acrylamides with two substituents on the nitrogen atom, derivatives thereof, or mixtures thereof. Acrylic polymers may include monomers other than acrylic monomers such as for example styrene, substituted styrene, vinyl acetate or ethylene.

Certain embodiments of the acrylic polymers containing tertiary-alkyl amide functionality of the present invention are acrylic polymers that include one or more alkyl methacrylate esters; when alkyl methacrylate esters are used, preferred are esters wherein the ester group consists of a linear, branched or cyclic alkyl group with 1 to 70 carbon atoms; more preferred is 1 to 10 carbon atoms; and most preferred is 1 to 4 carbon atoms. Also preferred are acrylic polymers that include one or more acid-functional monomers such as for example acrylic acid, methacrylic acid, crotonic acid, itaconic acid, fumaric acid, maleic acid, monomethyl itaconate, monomethyl maleate, monobutyl maleate, maleic anhydride, or mixtures thereof; when an acid-functional monomer is used, preferred are acrylic acid, methacrylic acid, and mixtures thereof. Preferred are acrylic polymers that contain little or no hydroxyl functionality; that is, hydroxyl groups that are not part of acid groups are considered undesirable as functional groups on the acrylic polymer.

The acrylic polymer having tertiary-alkyl amide functionality of the present invention is an acrylic polymer that has, attached to the polymer chain, at least one functional group with the following structure:

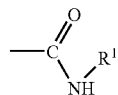

where $R^1$ has the structure:

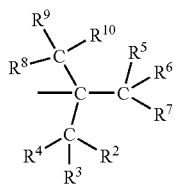

where $R^2$–$R^{10}$ are, independently, hydrogen or organic groups. The carbon atom of $R^1$ that is attached to the amide nitrogen is a tertiary alkyl carbon atom, so the functional group is said to have "tertiary-alkyl amide functionality." If any of $R^2$–$R^{10}$ are organic groups, they may be independently alkyl, cylcoalkyl, aryl, alkylaryl, unsaturated, and/or substituted with one or more halogen, amide, sulfonic, carbonyl, or other groups. Any substituent group is suitable, as long as the resulting polymer does not undesirably interfere with the moisture cure reaction of the hot-melt composition.

While the present invention is not limited to any particular theory or mechanism, the tertiary-alkyl amide functionality is believed to be desirable because the hydrogen atom attached to the amide nitrogen is believed to be reactive, but its reactivity is believed to be limited by the tertiary alkyl group on the amide nitrogen. The tertiary alkyl group is believed to provide steric hindrance, which allows the hydrogen atom on the amide nitrogen to be desirably reactive without being overly reactive.

The acrylic polymer having tertiary-alkyl amide functionality of the present invention may be made by any means known in the art, including for example, making an acrylic copolymer and then performing chemical reactions to add the desired tertiary-alkyl amide functionality to the polymer chain. Alternatively or additionally, the acrylic polymer having tertiary-alkyl amide functionality of the present invention may be made by polymerizing monomers that include at least one monomer that has tertiary alkyl amide functionality. One group of suitable monomers that have tertiary alkyl amide functionality is the group of substituted (meth)acrylamides that have the following structure:

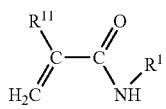

where $R^{11}$ is either hydrogen or methyl, and $R^1$ is defined above. Preferred monomers that have tertiary-alkyl amide functionality are 2-acrylamido 2-methylpropane sulfonic acid, diacetone (meth)acrylamide, N-tert-butyl (meth)acrylamide, N-tert-octyl (meth)acrylamide, and mixtures thereof; more preferred are N-tert-butyl methacrylamide, N-tert-butyl acrylamide, and mixtures thereof; and most preferred is N-tert-butyl acrylamide.

When the acrylic polymer having tertiary alkyl amide functionality of the present invention is made by inclusion of tertiary-alkyl amide functional monomers, the amount of such monomers suitable for inclusion in the polymer is from 0.1 to 20% by weight, based on the weight of the polymer. Preferred is 1 to 10%; more preferred is 2 to 7%; most preferred is 4 to 6%.

The acrylic polymer having tertiary-alkyl amide functionality of the present invention may be made by any method, including for example bulk polymerization, solution polymerization, suspension polymerization, or emulsion polymerization, as taught by K. J. Sunders in *Organic Polymer Chemistry*, Chapman and Hall, London, 1973. If water is used in the polymerization (as in, for example, aqueous suspension or emulsion polymerizations), most or all of the water must be removed from the acrylic polymer before the acrylic polymer is included in the moisture-reactive composition of the present invention. If solution polymerization is used, the solvent may be any solvent that has suitable compatibility with the monomer or monomers and with the resulting polymer. Toluene is known to be suitable. If any of the other components of the present invention, such as for example a liquid polyol, has suitable compatibility with the acrylic monomers and the acrylic polymer, that component may be used as the polymerization solvent for the acrylic polymer.

The acrylic polymer having tertiary-alkyl amide functionality of the present invention may be amorphous, crystalline, or a mixture of amorphous and crystalline; preferred are amorphous polymers. Crystalline polymers are those with a measurable melting point, and amorphous polymers are those that are not crystalline, as taught by L. H. Sperling in *Introduction to Physical Polymr Science*, 2nd edition, Wiley, 1992.

The amount of acrylic polymer having tertiary-alkyl amide functionality preferred for use in the present invention is 1 to 95% by weight, based on the weight of the hot-melt composition; more preferred is 1 to 90%; even more preferred is 10 to 60%; most preferred is 20 to 30%. The preferred molecular weight of the acrylic polymer (number average molecular weight, or $M_n$, as measured by gel permeation chromatography) is 10,000 to 100,000; more preferred is 15,000 to 80,000; most preferred is 30,000 to 40,000. The preferred glass transition temperature of the acrylic polymer ($T_g$, as measured by Dynamic Scanning Calorimetry), is 20° C. to 120° C.; more preferred is 30° C. to 90° C.; even more preferred is 40° C. to 80° C.; most preferred is 50° C. to 70° C.

When the acrylic polymer having tertiary-alkyl amide functionality of the present invention is made by solution polymerization in a solvent that is not one of the components of the present invention, the solvent may be removed, if desired, before the polymer is added to the other components of the present invention. Alternatively, the solution containing the acrylic polymer may be added to one or more components of the present invention and the solvent may be removed from the mixture, if desired, by means known in the art such as for example applying full or partial vacuum and/or by heating.

The components of the present invention preferably contain less than 1% water, more preferably less than 0.2% water, even more preferably less than 0.1%, by weight based on the total weight of the components.

The components may be mixed by conventional or other means, preferably in an inert, dry atmosphere. The components may be mixed together all at one time (in a "one stage" process); alternatively, some components and/or portions of components may be mixed together in one operation (or "stage"), with other components and/or portions of components added in additional stage or stages. Normally, the components are heated above room temperature. The components may be heated before, during, or after the process of mixing. If more than one stage of addition of components and/or mixing and/or heating is used, the mixture of one stage may be heated for a time before the next stage is added. Preferred temperature of heating is 50° C. to 130° C. If more than one stage is used, the temperature of each stage may be chosen independently. During any of the mixing and/or heating stages, full or partial vacuum may be applied; also nitrogen gas or other dry and/or inert gas may be used to blanket the surface of the admixture.

During the mixing and/or heating of the components of the present invention, the acrylic polymer having tertiary-alkyl amide functionality may be added to any of the stages. In one embodiment, a solution of the acrylic polymer having tertiary-alkyl amide functionality is added to one or more polyether polyols, and the mixture is heated under vacuum; other components are then added in one or more stages. If any material that is to be added to the reaction mixture is a solid, it is preferably solubilized by heating and mixing with at least one of the non-isocyanate containing components before being admixed with the polyisocyanate. In addition, a catalyst such as, for example, a tertiary amine or a tin-based catalyst may optionally be admixed with the components, either before, during, or after any one or more of the stages of mixing the components. When such an optional catalyst is used, the usual use level is less than 0.3% by weight based on the total weight of the admixed components. The adhesive composition of this invention, which is an NCO-functional composition, is stored, preferably under an inert, dry atmosphere until use.

The hot-melt composition may be formulated by admixing additional conventional ingredients such as fillers, pigments, tackifiers, plasticizers, rheology modifiers, thermoplastic acrylic resins, etc. with due regard to the reactivity of the NCO-functional groups, which is desirably maintained.

In the method of the present invention for bonding substrates, the moisture-reactive hot-melt composition is heated in order to achieve a viscosity suitable for transporting the adhesive, such as by pumping or gravity feed, to the application equipment and for the application of the adhesive to a first substrate in the presence of moisture. The temperature should be high enough to achieve a suitable viscosity but low enough to avoid excessive degradation or other undesirable effects on the adhesive. Typical useful temperatures are in the range of 40° C. to 160° C., preferably 50° C. to 150° C., and more preferably 100° C. to 140° C.

The application of the adhesive may be effected by conventional means such as, for example, heated spray applicator, heated bead applicator, heated nozzle, and heated roll coater, to form a continuous or discontinuous film of adhesive, as desired. The adhesive may also be applied to the substrate by hand, for example with a hand-held tool such as for example a spatula or other applicator. The adhesive may typically be applied at a level of 50 to 250 g/m² (4–20 g/ft²) although in cases where one of the substrates is a fabric it may be applied at a level as low as 1–50 g/m².

Then, the applied adhesive is contacted by a second substrate to provide a composite construction. Preferably, the adhesive is contacted by the second substrate while the adhesive has a temperature substantially above room temperature. The composite construction so formed is optionally subjected to applied pressure such as by passing it between rollers to effect increased contact of the substrates with the adhesive, and the composite construction is then cooled or allowed to cool. In another embodiment the adhesive may be simultaneously or sequentially applied to two surfaces of the first substrate, which adhesive-coated surfaces are then simultaneously or sequentially bonded to two further substrates, which may be the same or different. It is further contemplated that the composite construction may subsequently be bonded to other substrate(s) using the same or a different adhesive before or after the process described herein. The substrates to be bonded in the method of the present invention may be the same or different and include, for example, metal, wood, consolidated wood products, paper, elastomers, woven and nonwoven fabrics, and plastics which may have smooth or structured surfaces and are provided in the form of rolls, sheets, films, foils, etc. The substrates to be bonded in the method of the present invention include, for example, lauan mahogany plywood, impregnated paper, extruded polystyrene foam, expanded polystyrene foam, fiberglass reinforced polyester, polyester fabric, high or low pressure laminate, plywood, aluminum, steel, polyvinyl chloride, synthetic rubber, polymer blends, and engineering plastics.

It is contemplated that the moisture, i.e., water, which is anticipated to effect reaction with the NCO-functional groups thereby increasing the ultimate cohesive strength of the applied adhesive, may be exposed to the moisture-reactive hot-melt composition of the present invention in any of a variety of ways known in the art. For example, after the hot-melt composition is applied to one substrate but before it is contacted with a second substrate, the hot-melt composition may be exposed to moisture in a variety of ways, including for example ambient humidity, artificially increased or controlled humidified air, a mist of water droplets, a spray of liquid water contacting the applied adhesive, or combinations thereof Alternatively or additionally, after a second substrate is contacted with the hot-melt composition, the composite structure of subtrates and hot-melt composition may be exposed to moisture in any or all of the above ways. The method of exposing the composite struture to moisture is especially useful when one or more of the substrates is a material that is permeable to water vapor, such as for example wood, paper, or textile.

It is further contemplated that the moisture may be augmented by other ingredients that participate, catalyze, or otherwise facilitate the reactions of NCO functional groups with each other. Such an ingredient may be combined with the moisture during any or all or the curing process. Examples of such ingredients are certain amines, which are known to link NCO functional groups together through formation of biuret linkages. Also, some catalysts are known to enhace reactions of NCO functional groups to each other. Regardless of mechanism, the use of such ingredients to augment the moisture cure reaction is contemplated in the present invention.

In some embodiments of the present invention, the substrates that are bonded are relatively thin and flat, and in such cases the composite article is a called a laminate or laminated structure.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated.

In the Examples below, the following test procedures are used.

Green Strength

The adhesive is heated to equilibrium at 120° C. It is then applied to 0.125 inch (3.2 mm) thick birch laminated plywood at a thickness of 0.004 inch (0.10 mm). A second piece of identical plywood is laminated to the first, with an overlap area of 1 inch$^2$ (645 mm$^2$). The laminate is nipped under pressure of 10 psi (69 kPa). After a pause time, the strength of the laminate is measured with a tensile tester, using a pull rate of 0.05 inch/min (1.3 mm/min), in lap shear mode. The reported quantity is the maximum force divided by the overlap area. Enough laminates are produced so that measurements are made in triplicate at each pause time of 5, 10, 30, and 60 minutes.

Green strength is desirably at least 0.3 psi (2.1 kPa) at 5 minutes, and it desirably increases as it is tested at longer pause times.

Open Time

The pieces of wood in this procedure are birch laminated plywood, 3 inch×6 inch×0.125 inch (76 mm×152 mm×3.2 mm). The adhesive is heated to equilibrium at 120° C. and then applied to a piece of wood at thickness of 0.004 inch (0.1 mm). Other pieces of wood are laminated to the first at time intervals of 1, 3, 5, 7, and 9 minutes under 10 psi (69 kPa) pressure. Overlap area for each piece of wood is 1 inch$^2$ (645 mm$^2$). Laminates are stored in a constant temperature (25° C.) and humidity (50% RH) room for 1 day or 7 days and tested in a tensile tester with a pull rate of 0.05 inch/min (1.3 mm/min), in lap shear mode. The open time was arbitrarily selected as the time interval at which less than 75% contactability or wood tear is observed after the tensile test.

Adhesion to Surlyn™ Resins

The adhesive is heated to equilibrium at 120° C. and applied to a base material of polycarbonate/ABS at 130 g/m$^2$, followed by lamination after a 5 minute open time with a second substrate consisting of Surlyn™ ionomer resin (from E.I. DuPont de Nemours and Company). Samples then cure for 5 days at 25° C. and 50% relative humidity. Substrates are then separated in 90° peel fashion in a tensile tester at 50 mm/min. The reported quantity is the maximum force divided by the width of the sample.

Film Properties

A film of adhesive is cast onto a silicone release liner at thickness of 0.006 inch (0.15 mm). The film cures for 7 days and is then tested in tension on a tensile tester. The reported quantities are (1) T100, the force at 100% elongation divided by the cross-sectional area of the sample; (2) Tbreak, the force at break divided by the cross-sectional area of the sample; and (3) Emax, the elongation at break.

EXAMPLES

Example 1 (Comparative)

The ingredients were as follows:

| (1) | polypropylene glycol (Mw 2000) | 168.58 g |
|---|---|---|
| (2) | Castor Oil | 9.72 g |
| (3) | Acrylic Polymer (Tg of 60° C.; includes no tertiary-alkyl amide functional monomer) | 155.00 g |
| (4) | Methylene bisphenyl diisocyanate | 51.63 g |
| (5) | 1,6 hexanediol adipate (Mw 3500) | 115.07 g |
| (6) | 2,2' dimorpholinoethyl ether | 0.30 g |

To a 1 liter resin kettle were added raw materials (1) thru (3). The acrylic polymer was added as a 60% by weight solution in toluene. After fitting the kettle with a mechanical stirrer and reactor head, heat was applied to the kettle to raise the temperature to 85° C. At that point, a vacuum of 20 in. Hg (67 kPa) was applied to the kettle to remove the toluene. After removing the bulk of the solvent, the temperature was slowly raised to 110° C. and the vacuum increased to 27 in. Hg (91 kPa) to remove residual solvent and moisture. After 30 minutes under these conditions, the temperature was lowered to 100° C. and the vacuum removed with dry nitrogen. Item (4) was then added and the vacuum replaced. The temperature was allowed to re-equilibrate to 100° C., at which temperature, the reaction was allowed to hold for 90 minutes. The vacuum was once again released with dry nitrogen, at which point item (5) was added. After re-applying the vacuum, the reaction was continued for 30 minutes at 100° C. Item 6 was then added and the mixture was allowed to heat for an additional 30 minutes. The reactive hot melt was heated to 115° C. and poured into a 1 pint (0.47 liter) plastic container where it was blanketed with nitrogen and sealed.

Example 2

Identical to example 1 except that the acrylic polymer included N-tert-butyl acrylamide, in the amount 5% by weight based on the weight of the acrylic polymer.

Example 3 (Comparative)

The ingredients were as follows:

| (1) | polypropylene glycol (Mw 1000) | 106.61 g |
|---|---|---|
| (2) | polypropylene glycol (Mw 2000) | 137.62 g |
| (3) | Castor Oil | 15.74 g |
| (4) | Acrylic Polymer (as in Example 1) | 132.00 g |
| (5) | Methylene bisphenyl diisocyanate | 92.03 g |
| (6) | 1,6 hexanediol adipate (Mw 2000) | 65.99 g |
| (7) | 2,2' dimorpholinoethyl ether | 0.33 g |

To a 1 liter resin kettle were added raw materials (1) thru (4). After fitting the kettle with a mechanical stirrer and reactor head, heat was applied to the kettle to raise the temperature to 85° C. At that point, a vacuum of 20 in. Hg 68 kPa) was applied to the kettle to remove the toluene. After removing the bulk of the solvent, the temperature was slowly raised to 110° C. and the vacuum increased to 27 in. Hg (91 kPa) to remove residual solvent and moisture. After 30 minutes under these conditions, the temperature was lowered to 100° C. and the vacuum removed with dry nitrogen. Item (5) was then added and the vacuum replaced. The temperature was allowed to re-equilibrate to 100° C., at which temperature, the reaction was allowed to hold for 90 minutes. The vacuum was once again released with dry nitrogen, at which point item (6) was added. After re-applying the vacuum, the reaction was continued for 30 minutes at 100° C. Item 7 was then added and the mixture was allowed to heat for an additional 30 minutes. The reactive hot melt was heated to 115° C. and poured into a 1 pint (0.47 liter) plastic container where it was blanketed with nitrogen and sealed.

Example 4

Identical to Example 3, except that the acrylic polymer was the same as that used in Example 2.

Example 5 (Comparative)

The ingredients were as follows:

| | | |
|---|---|---|
| (1) | polypropylene glycol (Mw 2000) | 116.90 g |
| (2) | Castor Oil | 9.65 g |
| (3) | Acrylic Polymer (as in Example 1) | 112.00 g |
| (4) | Methylene bisphenyl diisocyanate | 49.68 g |
| (5) | 1,6 hexanediol neopentyl glycol adipate (Mw 2000) | 111.76 g |
| (6) | 2,2' dimorpholinoethyl ether | 0.24 g |

The procedure used for mixing and heating the ingredients was the same as in Example 1.

Example 6

Identical to Example 5, except that the acrylic polymer was the same as that used in Example 2.

Example 7

The results of the green strength and open time tests were as follows:

| | Green Strength, psi (kPa) | | | | |
|---|---|---|---|---|---|
| Example | 5 min. | 10 min. | 30 min. | 60 min. | Open Time (min.) |
| 1 (comparative) | 77 (531) | 77 (531) | 100 (690) | 103 (710) | <1 |
| 2 | 3.0 (21) | 4.7 (32) | 90 (617) | 110 (758) | 6 |
| 3 (comparative) | 0.8 (5.5) | 1.5 (10.3) | 12.7 (87.6) | 14.7 (101) | <30 |
| 4 | 0.4 (2.8) | 0.6 (4.1) | 0.7 (4.8) | 3.5 (24.1) | >30 |
| 5 (comparative) | 9.0 (62) | 14.7 (101) | 14.6 (101) | 16.3 (112) | <1 |
| 6 | 1.5 (10.3) | 1.5 (10.3) | 2.4 (15.5) | 4.4 (30.3) | >9 |

Each example of the present invention (2, 4, and 6) displayed longer open time than its comparative counterpart (1, 3, and 5, respectively), while it fully high green strength.

Example 8

The results of the Tensile Properties tests were as follows:

| Example | T100, psi (Pa) | Tbreak psi (Pa) | Emax. % |
|---|---|---|---|
| 3 (comparative) | 819 (5.65) | 2129 (14.7) | 602 |
| 4 | 667 (4.60) | 2136 (14.7) | 642 |
| 5 (comparative) | 365 (2.52) | 1011 (6.97) | 630 |
| 6 | 354 (2.44) | 1234 (8.51) | 762 |

Each example of the present invention (Examples 4 and 6) showed tensile properties equivalent to its corresponding comparative example (Examples 3 and 5, respectively).

Example 9

The results of the Adhesion to Surlyn™ tests were as follows:

| Example | Adhesion to Surlyn ™, lbf/inch (N/m) |
|---|---|
| 3 (comparative) | 4.7 (0.21) |
| 4 | 13 (0.57) |

Example 4 of the present invention showed better adhesion to Surlyn™ than Example 3 the corresponding comparative example.

I claim:

1. A moisture-reactive hot-melt polymer composition formed by admixing components comprising at least one polyol, at least one polyisocyanate, and at least one acrylic polymer having tertiary-alkyl amide functionality, wherein said acrylic polymer having tertiary alkyl amide functionality has glass transition temperature of 20° C. to 120° C., and wherein said acrylic polymer having tertiary alkyl amide functionality has no hydroxyl functionality.

2. The composition of claim 1, wherein said acrylic polymer is 1 to 90 weight percent of said composition, based on the total weight of said composition.

3. The composition of claim 1, wherein said acrylic polymer includes at least one tertiary-alkyl amide functional monomer selected from the group consisting of N-tert-butylacrylamide, N-tert-butylmethacrylamide, 2-acrylamido 2-methylpropane sulfonic acid, diacetone acrylamide, diacetone methacrylamide, N-tert-octyl acrylamide, N-tert-octyl methacrylamide, and mixtures thereof.

4. The composition of claim 1, wherein said polyol comprises at least one polyester polyol and at least one polyether polyol.

5. The composition of claim 1, wherein said acrylic polymer is 1 to 90 weight percent of said composition, based on the total weight of said composition; wherein said acrylic polymer includes at least one tertiary-alkyl amide functional monomer selected from the group consisting of N-tert-butylacrylamide, N-tert-butylmethacrylamide, 2-acrylamido 2-methylpropane sulfonic acid, diacetone acrylamide, diacetone methacrylamide, N-tert-octyl acrylamide, N-tert-octyl methacrylamide, and mixtures thereof; and wherein said polyol comprises at least one polyester polyol and at least one polyether polyol.

6. A method of making a moisture-reactive hot-melt composition comprising admixing components comprising at least one polyol, at least one polyisocyanate, and at least one acrylic polymer having tertiary-alkyl amide functionality, wherein said acrylic polymer having tertiary alkyl amide functionality has glass transition temperature of 20° C. to 120° C., and wherein said acrylic polymer having tertiary alkyl amide functionality has no hydroxyl functionality.

7. The method of claim 6, wherein said acrylic polymer is 1 to 90 weight percent of said composition, based on the total weight of said composition; wherein said acrylic polymer includes at least one tertiary-alkyl amide functional monomer selected from the group consisting of N-tert-butylacrylamide, N-tert-butylmethacrylamide, 2-acrylamido 2-methylpropane sulfonic acid, diacetone acrylamide, diacetone methacrylamide, N-tert-octyl acrylamide, N-tert-octyl methacrylamide, and mixtures thereof; and wherein said polyol comprises at least one polyester polyol and at least one polyether polyol.

8. A method for bonding substrates comprising
(a) making a moisture-reactive hot-melt composition comprising admixing components comprising at least one polyol, at least one polyisocyanate, and at least one acrylic polymer having tertiary-alkyl amide functionality, wherein said acrylic polymer having tertiary alkyl amide functionality has glass transition temperature of 20° C. to 120° C., and wherein said acrylic polymer having tertiary alkyl amide functionality has no hydroxyl functionality;
(b) heating said hot-melt composition;
(c) applying said heated hot-melt composition to a first substrate;
(d) contacting said applied heated hot-melt composition with a second substrate; and
(e) cooling, or allowing to cool, said hot-melt composition.

9. The method of claim 8, wherein said acrylic polymer is 1 to 90 weight percent of said composition, based on the total weight of said composition; wherein said acrylic polymer includes at least one tertiary-alkyl amide functional monomer selected from the group consisting of N-tert-butylacrylamide, N-tert-butylmethacrylamide, 2-acrylamido 2-methylpropane sulfonic acid, diacetone acrylamide, diacetone methacrylamide, N-tert-octyl acrylamide, N-tert-octyl methacrylamide, and mixtures thereof; and wherein said polyol comprises at least one polyester polyol and at least one polyether polyol.

10. The moisture-reactive hot-melt polymer composition of claim 1, wherein said acrylic polymer having tertiary alkyl amide functionality has glass transition temperature of 30° C. to 120° C.

11. The method of claim 8, wherein said acrylic polymer having tertiary alkyl amide functionality has glass transition temperature of 30° C. to 120° C.

* * * * *